(12) United States Patent
Kojima (10) Patent No.: US 11,060,537 B1
(45) Date of Patent: Jul. 13, 2021

(54) CYLINDER DEVICE (71) Applicant: KOSMEK LTD., Kobe (JP)

(72) Inventor: Ryota Kojima, Kobe (JP)

(73) Assignee: KOSMEK LTD., Kobe (JP)

( * ) Notice: Subject to any disclaimer, the term of this patent is extended or adjusted under 35 U.S.C. 154(b) by 0 days.

(21) Appl. No.: 16/756,646

(22) PCT Filed: Oct. 1, 2018

(86) PCT No.: PCT/JP2018/036712
§ 371 (c)(1),
(2) Date: Apr. 16, 2020

(87) PCT Pub. No.: WO2019/077987
PCT Pub. Date: Apr. 25, 2019

(30) Foreign Application Priority Data

Oct. 17, 2017 (JP) .............................. JP2017-201443

(51) Int. Cl.
*F15B 15/14* (2006.01)
*F16J 10/02* (2006.01)
*F16J 10/00* (2006.01)

(52) U.S. Cl.
CPC ............. *F15B 15/149* (2013.01); *F16J 10/02* (2013.01); *F16J 10/00* (2013.01)

(58) Field of Classification Search
CPC .................................................. F15B 15/149
See application file for complete search history.

(56) References Cited

U.S. PATENT DOCUMENTS 2,902,007 A * 9/1959 Rockwell .............. F15B 15/149
91/401
3,592,106 A * 7/1971 Baughman ............ F15B 15/224
92/85 R
(Continued)

FOREIGN PATENT DOCUMENTS

| EP | 0784159 A1 | 7/1997 |
| JP | 59-165273 U | 11/1984 |
| JP | 2013-007407 A | 1/2013 |

OTHER PUBLICATIONS

Search Report dated Dec. 19, 2018, issued in corresponding International Application No. PCT/JP2018/036712.
(Continued)

*Primary Examiner* — Michael Leslie
(74) *Attorney, Agent, or Firm* — Bacon & Thomas, PLLC (57) ABSTRACT

A piston (6) is hermetically inserted via a sealing member (7) in a cylinder hole (2) provided in a housing (1) so that the piston (6) is movable in an up-down direction. A communication passage (21) provided in an inner peripheral wall of the cylinder hole (2) is communicatively connected to a lock-side supply and discharge passage (13) through which pressurized oil is supplied to and discharged from a lock chamber (11) of the housing (1). An opening area ($S_1$) of the communication passage (21) is designed to be smaller than an opening area ($S_2$) of the lock-side supply and discharge passage (13). When the piston (6) is caused to move for releasing from a raised position to a lower limit position, the sealing member (7) is lowered from the raised position beyond the communication passage (21), to open communication between a release chamber (12) in the housing (1) and the lock-side supply and discharge passage (13) via the communication passage (21).

2 Claims, 7 Drawing Sheets

(56) References Cited

U.S. PATENT DOCUMENTS

| | | | | |
|---|---|---|---|---|
| 3,853,368 | A * | 12/1974 | Eichelsheim | F15B 15/1447 |
| | | | | 180/89.14 |
| 7,537,079 | B2 * | 5/2009 | Krieger | B62D 5/061 |
| | | | | 180/414 |
| 9,500,281 | B2 * | 11/2016 | Saito | F16J 10/02 |
| 10,052,801 | B2 * | 8/2018 | Galati | F15B 21/044 |
| 10,605,276 | B2 * | 3/2020 | Iverson | F15B 15/1428 |

OTHER PUBLICATIONS

Search Report dated Sep. 17, 2020, issued in corresponding International Application No. PCT/JP2018/036712.

* cited by examiner

CYLINDER DEVICE

TECHNICAL FIELD

The present invention relates to a cylinder device. In particular, the present invention relates to a cylinder device including a mechanism configured to discharge pressure fluid in a release chamber to an outside of the release chamber when a piston is moved to a release-side limit position.

BACKGROUND ART

Such a known cylinder device is, for example, described in Patent Literature 1 (Japanese Unexamined Patent Publication No. 2013-007407). The known device is structured as follows.

A piston is inserted in a cylinder hole of a housing so as to be movable in an up-down direction. A lock chamber is provided above the piston and a release chamber is provided below the piston. A communication hole for communication between the lock chamber and the release chamber is provided in the piston so as to extend in the up-down direction. A valve member configured to open/close communication through the communication hole is inserted in the communication hole so as to be movable in the up-down direction. The valve member is biased by a valve-closing spring toward the lock chamber above the valve member.

As the cylinder device is caused to transition from a lock state to a release state for releasing, the piston is moved upward from a lower limit position to an upper limit position. Then, the valve member is received by an upper end wall of the housing, but only the piston is further moved upward. Due to this, the valve member is moved downward relative to the piston for valve opening. As a result, pressurized oil (pressure fluid) supplied to the release chamber flows to the lock chamber through the communication hole.

CITATION LIST

Patent Literature

Patent Literature 1: Japanese Unexamined Patent Publication No. 2013-007407

SUMMARY OF INVENTION

Technical Problem

The above-described known device has the following disadvantage.

In the above-described known device, such a large spring strongly biasing the valve member has to be provided in the piston to prevent the valve member from being operated for valve opening by the pressure of pressurized oil supplied to the lock chamber in the lock state of the cylinder device. This makes the size of the piston in its thickness direction (in the up-down direction) large and also makes the overall size of the cylinder device large.

An object of the present invention is to provide a compact cylinder device including a mechanism configured to discharge pressure fluid in a release chamber to an outside of the release chamber.

Solution to Problem

In order to achieve the above object, in the present invention, a cylinder device is structured as follows, as shown in FIG. 1A to FIG. 3A and FIG. 3B, for example.

A piston 6 is hermetically inserted via a sealing member 7 in a cylinder hole 2 provided in a housing 1 so that the piston 6 is movable in an axial direction. A lock chamber 11 is provided on a first-end side of the piston 6 in the axial direction. A release chamber 12 is provided on a second-end side of the piston 6 in the axial direction. Pressure fluid is supplied to and discharged from the lock chamber 11 through a lock-side supply and discharge passage 13. Pressure fluid is supplied to and discharged from the release chamber 12 through a release-side supply and discharge passage 14. A communication passage 21 is provided in an inner peripheral wall of the cylinder hole 2. An opening area $S_1$ of the communication passage 21 is designed to be smaller than an opening area $S_2$ of a cylinder-hole-side opening of the lock-side supply and discharge passage 13 which is close to the cylinder hole 2. When the piston 6 is moved from the second end side to a limit position on the first end side, the sealing member 7 is moved from a position closer to the second end side than the communication passage 21 toward the first end side beyond the communication passage 21, thereby to open communication between the release-side supply and discharge passage 14 and the lock-side supply and discharge passage 13 through the release chamber 12 and through the communication passage 21. When the piston 6 is moved from the limit position on the first end side toward the second end side, the sealing member 7 is moved from a position closer to the first end side than the communication passage 21 toward the second side beyond the communication passage 21, thereby to close communication between the release chamber 12 and the communication passage 21.

In the above aspect of the present invention, the following functions and effects are provided.

In the cylinder device of an above aspect of the present invention, a valve member and a valve-closing spring do not have to be provided in the piston, differently from the above-described known cylinder device. This makes it possible to downsize the piston in its axial direction (thickness direction). This allows the cylinder device to be compact in size with a mechanically simple structure.

Furthermore, in the cylinder device of the above aspect of the present invention, immediately after the start of causing the cylinder device to transition from the release state to the lock state for locking, pressure fluid flows from the lock-side supply and discharge passage into the release chamber through the communication passage, and pressure fluid flows from the lock-side supply and discharge passage into the lock chamber. However, the opening area of the lock-side supply and discharge passage is designed to be larger than the opening area of the communication passage, and this allows the flow rate of pressure fluid flowing from the lock-side supply and discharge passage into the lock chamber to be larger than the flow rate of pressure fluid flowing from the lock-side supply and discharge passage into the release chamber through the communication passage. Due to this, the pressure of the pressure fluid in the lock chamber becomes higher than the pressure of the pressure fluid in the release chamber, and the pressure differential between the pressure in the lock chamber and the pressure in the release chamber reliably causes the piston to move for locking. As a result, it is possible to prevent the piston from being stopped at anywhere on the way to a destination in the cylinder hole.

It is preferable to incorporate the following features into the above aspect of the present invention.

As shown in FIG. 1A to FIG. 3A and FIG. 3B, for example, the cylinder hole 2 is structured by a small-diameter hole 3 provided in the housing 1 and an inner peripheral hole 5a of an annular sleeve 5 attached to a large-diameter hole 4 provided on the first end side of the small-diameter hole 3. The communication passage 21 is provided between a step portion 20, which is provided between the small-diameter hole 3 and the large-diameter hole 4, and a second-end-side end surface 5b of the annular sleeve 5 so that the communication passage 21 extends in a circumferential direction.

In this arrangement, because the communication passage is provided so as to extend in the circumferential direction, the sealing member passing by the opening of the communication passage is less likely to be damaged. This leads to extension of the life of the sealing member.

It is preferable to incorporate the following features into the above aspect of the present invention.

As shown in FIG. 1A to FIG. 3A and FIG. 3B, for example, at least one through hole 17 structuring a part of the lock-side supply and discharge passage 13 is provided at the annular sleeve 5; and an opening of the through hole 17 functions as the cylinder-hole-side opening of the lock-side supply and discharge passage 13.

In this arrangement, it is easy to adjust the opening area of the cylinder-hole-side opening of the lock-side supply and discharge passage.

DESCRIPTION OF EMBODIMENTS

The following describes an embodiment of the present invention with reference to FIG. 1A to FIG. 3A and FIG. 3B.

A housing 1 of a cylinder device is fixed to a table T functioning as a stationary stand by a plurality of bolts (not shown). The housing 1 includes a lower wall 1a, a barrel portion 1b, and an upper wall 1c, which are provided in this order from a lower side (one-end side). A cylinder hole 2 is provided in the housing 1. The cylinder hole 2 is structured by: a small-diameter hole 3 provided in the housing 1; and an inner peripheral hole 5a of an annular sleeve 5 attached to a large-diameter hole 4 provided below the small-diameter hole 3. The small-diameter hole 3 and the inner peripheral hole 5a of the annular sleeve 5 are designed to have a substantially same diameter. A piston 6 is hermetically inserted in the cylinder hole 2 via a sealing member 7 so as to be movable in an up-down direction (axial direction). The sealing member 7 is structured by: an inner sealing member 7a made of rubber or the like; and an outer sealing member 7b made of synthetic resin or the like. An output rod 10 protrudes upward from the piston 6, and the output rod 10 is hermetically inserted in the upper wall 1c of the housing 1 so as to be movable in the up-down direction.

A lock chamber 11 is provided between the piston 6 and the lower wall 1a. A release chamber 12 is provided between the piston 6 and the upper wall 1c. Pressurized oil (pressure fluid) is supplied to and discharged from the lock chamber 11 via a lock-side supply and discharge passage 13. Pressurized oil (pressure fluid) is supplied to and discharged from the release chamber 12 via a release-side supply and discharge passage 14.

Figure 2A:
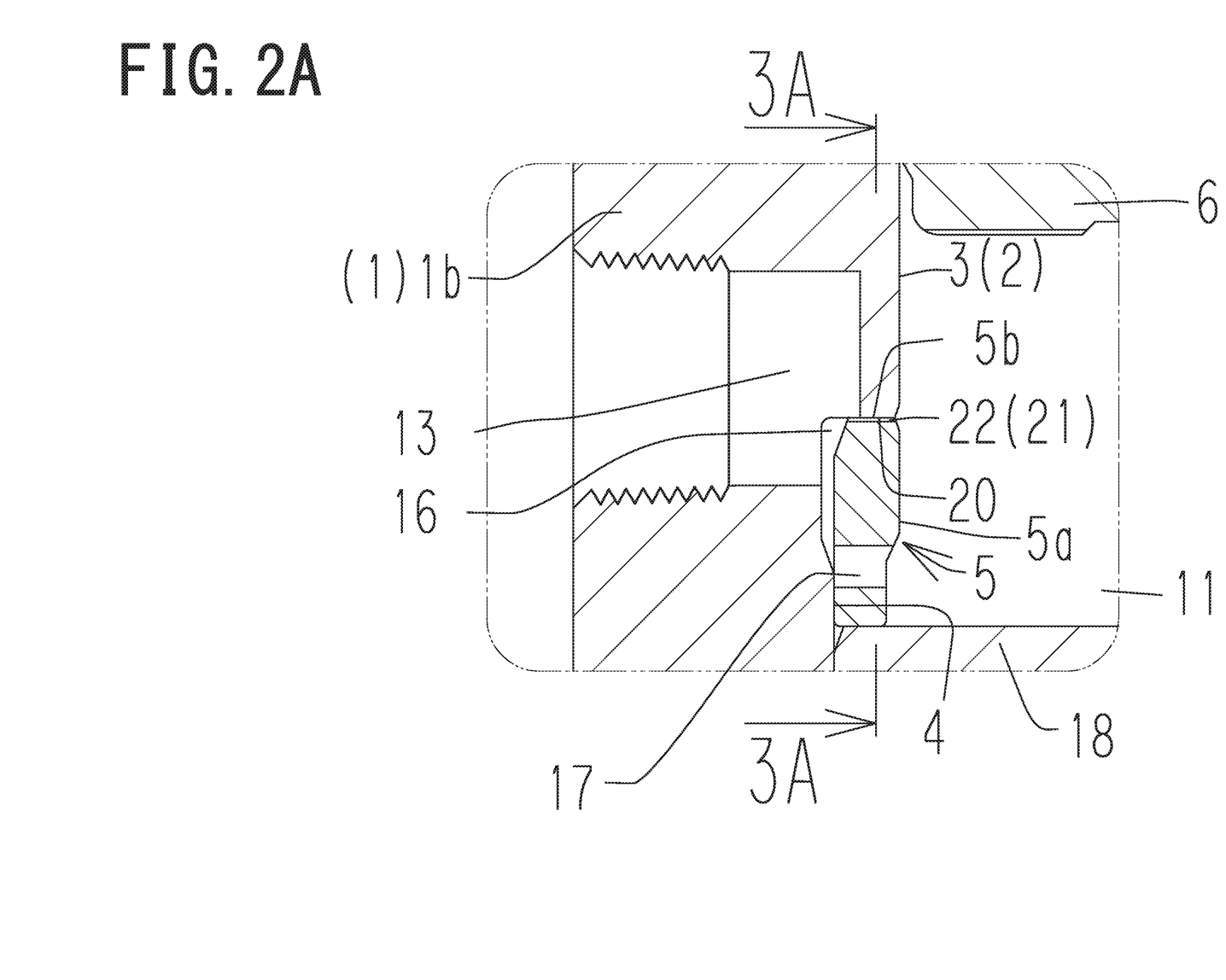
FIG. 2A is an enlarged view of a part 2A in FIG. 1A.

As shown in FIG. 2A (FIG. 2B and FIG. 2C), an annular space 16 is created between an outer peripheral surface of the annular sleeve 5 and the large-diameter hole 4, and the annular space 16 is communicatively connected to a lower portion of the lock chamber 11 via through holes 17 provided at a lower portion of the annular sleeve 5.

Figure 2B:
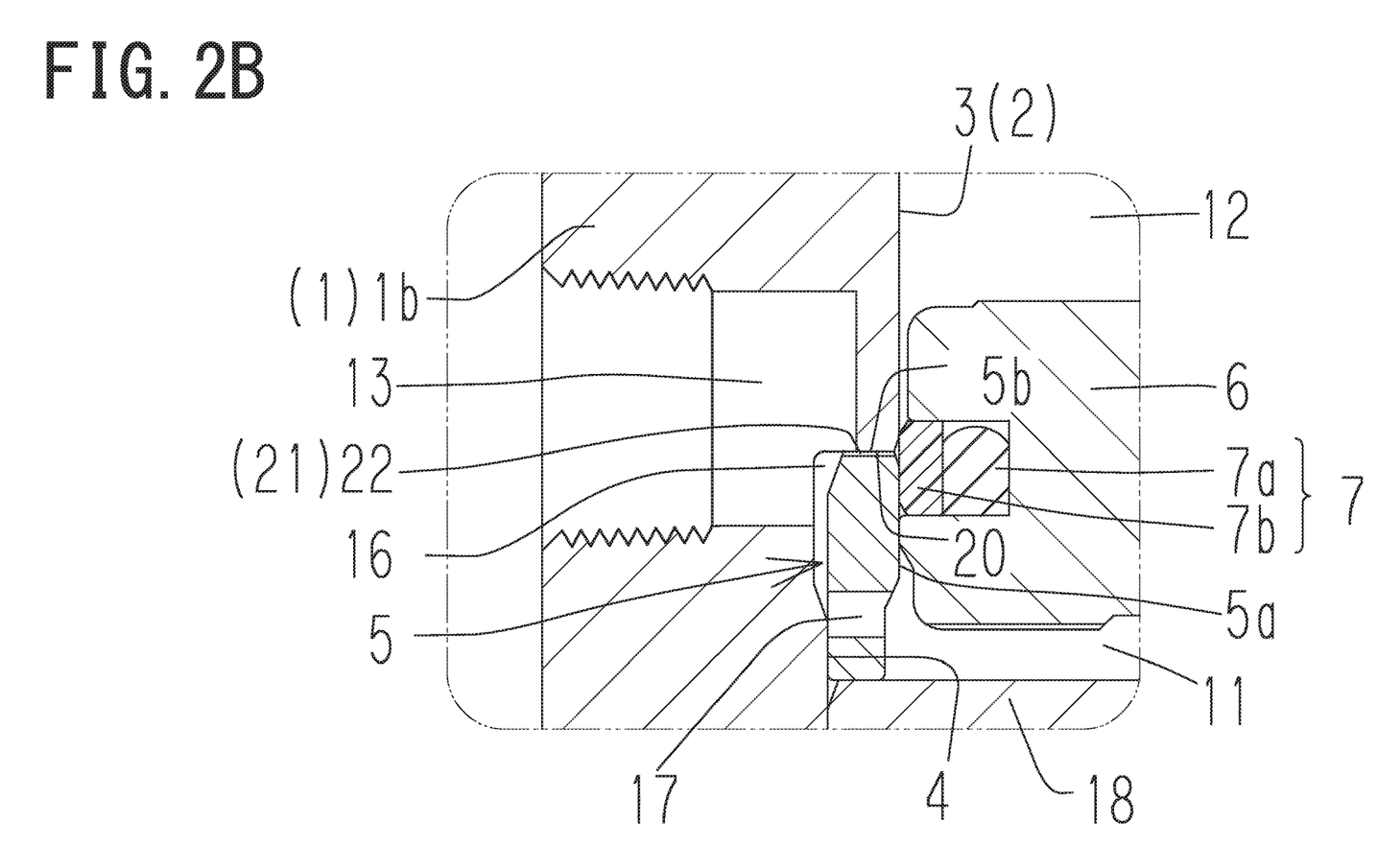
FIG. 2B is a diagram illustrating the operation of the cylinder device and similar to FIG. 2A.
Figure 2C:
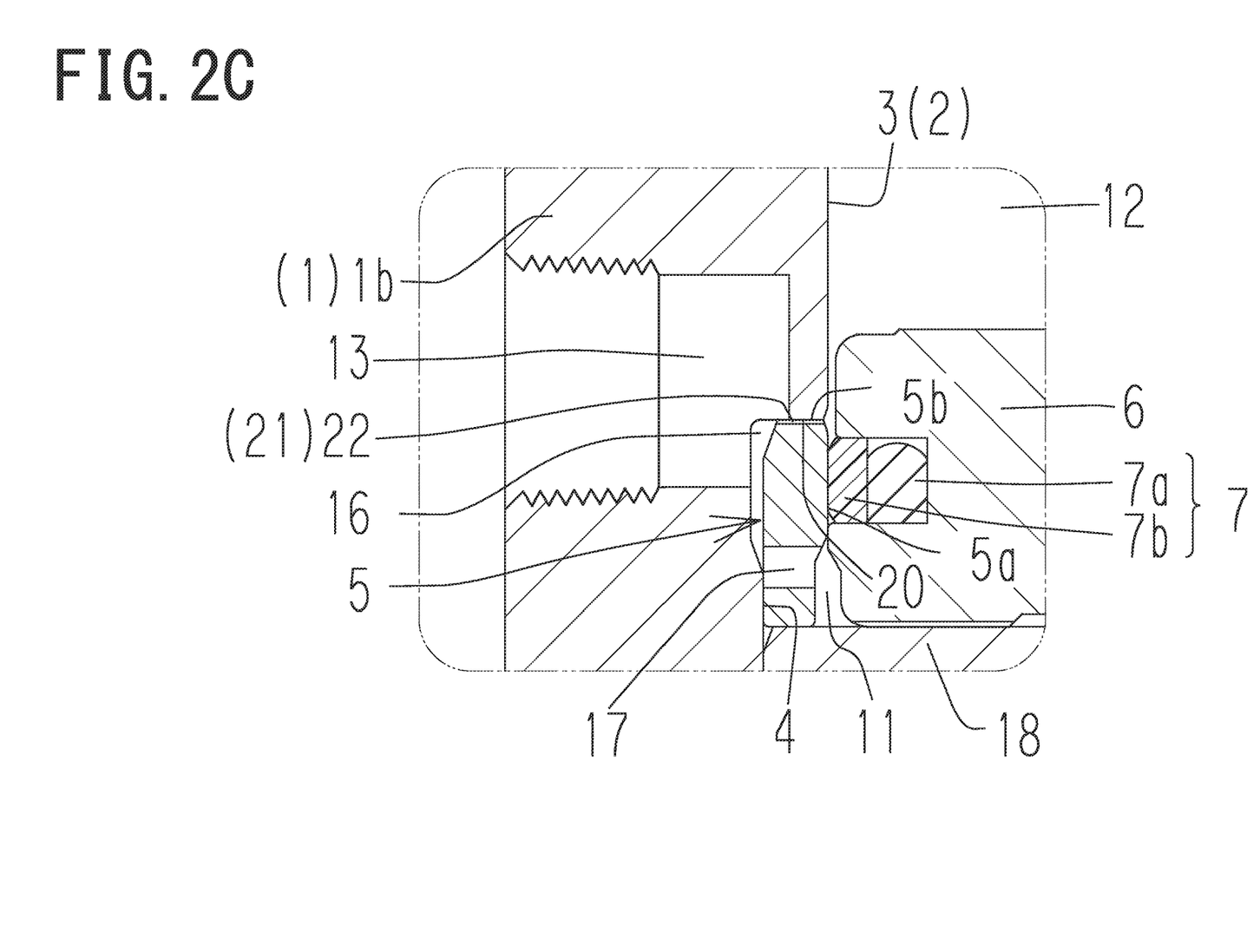
FIG. 2C is an enlarged view of a part 2C in FIG. 1B, and is a diagram similar to FIG. 2A.

In this embodiment, the plurality of through holes 17 are disposed at predetermined intervals in a circumferential direction. The annular space 16 and the through holes 17 function as a part of the lock-side supply and discharge passage 13.

As shown in FIG. 2A to FIG. 3A, a lid member 18 structuring a part of the lower wall 1a of the housing 1 is fixed to the barrel portion 1b of the housing 1 by bolts (not shown). The lid member 18 pushes the annular sleeve 5 upward, and an upper end surface 5b of the annular sleeve 5 is pressed onto a step portion 20 provided between the small-diameter hole 3 and the large-diameter hole 4.

As shown in FIG. 2A to FIG. 3A, a communication passage 21 is provided at an upper end portion of the annular sleeve 5. Due to this, depending on whether the sealing member 7 has passed by the communication passage 21, the state of communication is changeable between: a communicative state (FIG. 2C) in which communication between a lower portion of the release chamber 12 and the lock-side supply and discharge passage 13 via the communication passage 21 is opened; and a non-communicative state (FIG. 2A) in which communication between the release chamber 12 and the communication passage 21 is closed by the sealing member 7.

Figure 3A:
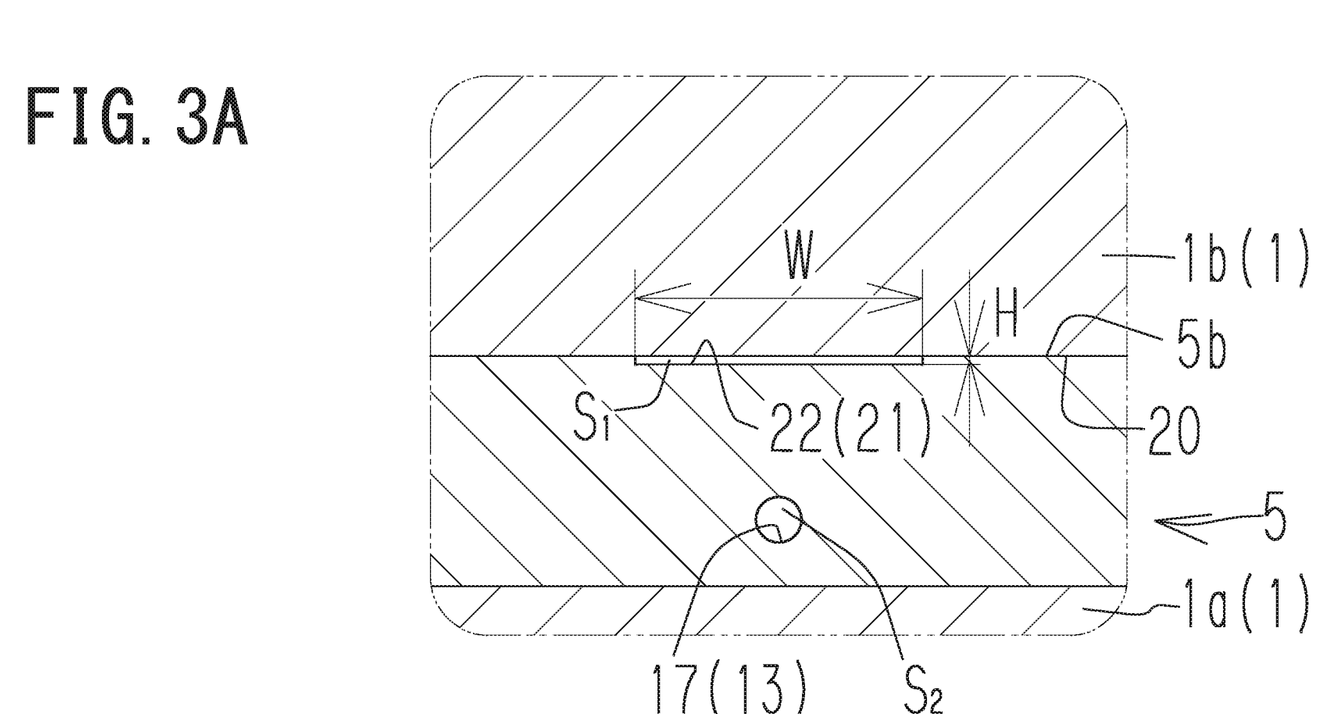
FIG. 3A is a diagram corresponding to a cross section taken along a line 3A-3A in FIG. 2A.

In this embodiment, three radially oriented shallow grooves 22 are provided at the upper end portion of the annular sleeve 5 at predetermined intervals in the circumferential direction, and the grooves 22 structure the communication passage 21. As shown in FIG. 3A, for the cylinder hole 2 with a diameter of about 40 mm, the three grooves 22 are provided, for example, and each groove 22 is designed to have a depth H of on the order of 0.05 mm to 0.2 mm and a width W of on the order of 7.5 mm to 15 mm. Thus, the depth H of the grooves of the communication passage 21 is designed to be considerably smaller than the width W of the grooves of the communication passage 21. Meanwhile, the size of the sealing member 7 in the up-down direction is designed to be on the order of 2.00 mm to 4.00 mm. The size of the sealing member 7 in the up-down direction is designed to be considerably larger than the depth H of the grooves of the communication passage 21. This prevents the sealing member 7 from being damaged at a boundary portion between an inner peripheral wall of the cylinder hole 2 and an inner peripheral wall of the annular sleeve 5 when the sealing member 7 of the piston 6 passes by the communication passage 21. Moreover, the communication passage 21 made up of the shallow grooves is easily producible without laborious work in machine processing.

Furthermore, in this embodiment, an opening area $S_1$ of the communication passage 21 ($S_1 = W \times H \times N$ (where N is the number of communication holes)) is designed to be smaller than an opening area $S_2$ of the through holes 17 of the annular sleeve 5 (in this embodiment, the opening area $S_2$ corresponds to the opening areas of the three through holes 17). Because the through holes 17 structure a part of the lock-side supply and discharge passage 13 as described above, the openings of the through holes 17 for the opening area $S_2$ can be said as a cylinder-hole-side opening of the lock-side supply and discharge passage 13 which is close to the cylinder hole 2.

Figure 3B:
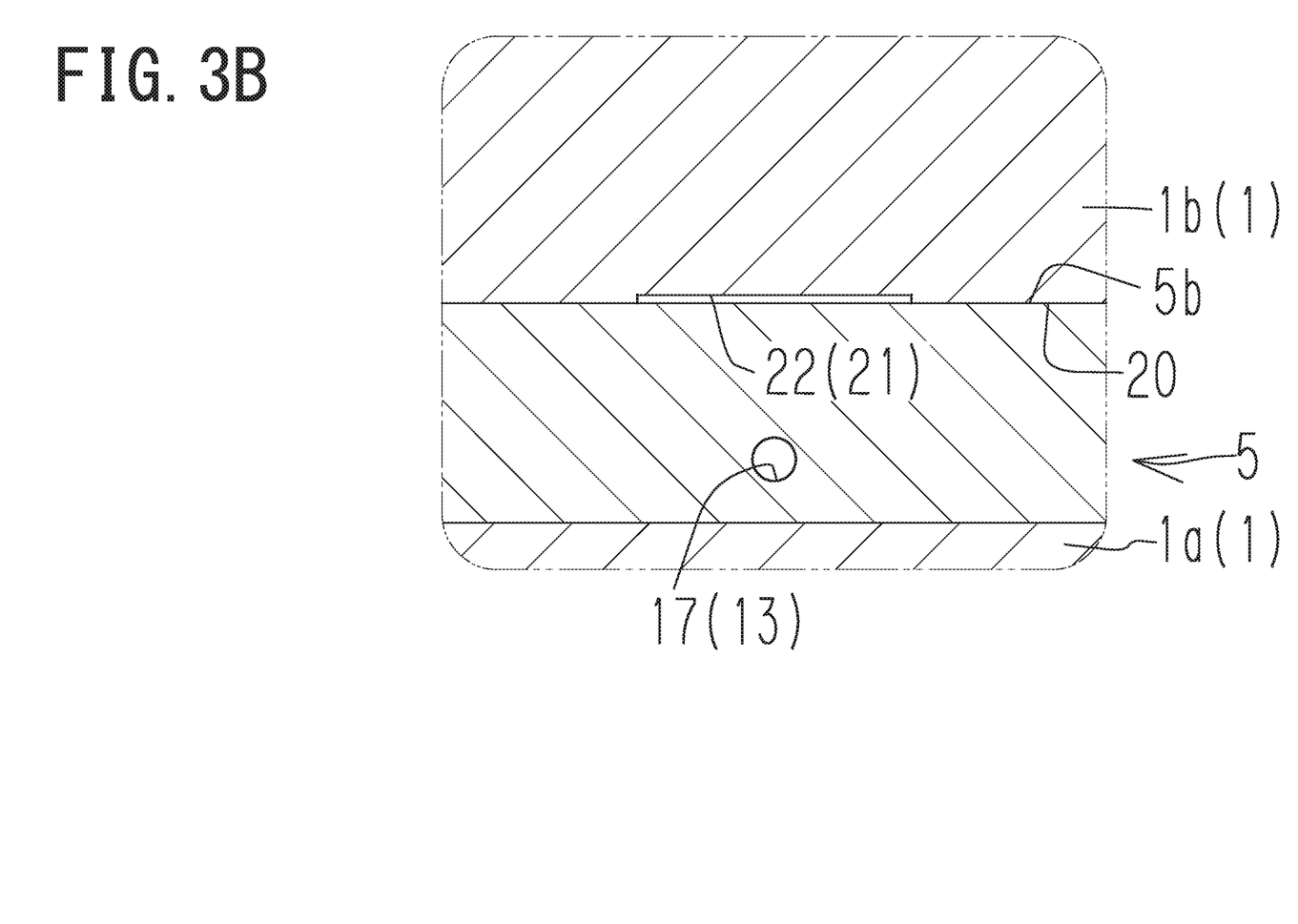
FIG. 3B shows a modification of the above embodiment, and is a diagram similar to FIG. 3A.

Instead of the arrangement of the above-described embodiment in which the communication passage 21 is provided at the upper end portion of the annular sleeve 5, the communication passage 21 may be provided at the step portion 20 as shown in FIG. 3B.

The cylinder device described above operates as follows, as shown in FIG. 1A and FIG. 1B (and FIG. 2A to FIG. 2C).

Figure 1A:
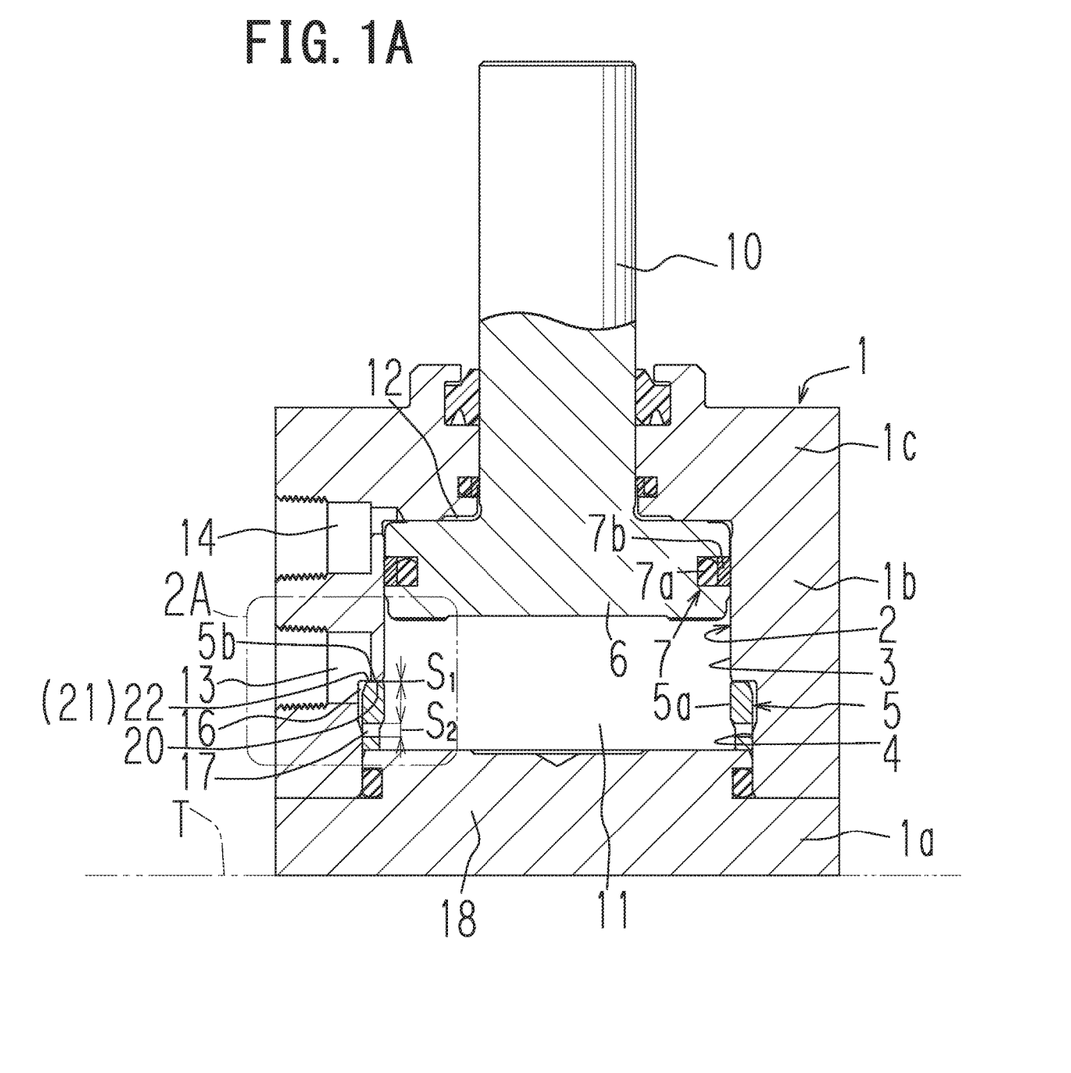
FIG. 1A shows an embodiment of a cylinder device of the present invention, and is a partial elevational view in section of the cylinder device in a lock state.

In a lock state shown in FIG. 1A, pressurized oil (pressure fluid) has been discharged from the release chamber 12 to a tank through the release-side supply and discharge passage 14, and pressurized oil has been supplied by a pressurized oil supply source from the tank to the lock chamber 11 through the lock-side supply and discharge passage 13. Due to this, the pressurized oil in the lock chamber 11 has moved the piston 6 to an upper limit position.

Figure 1B:
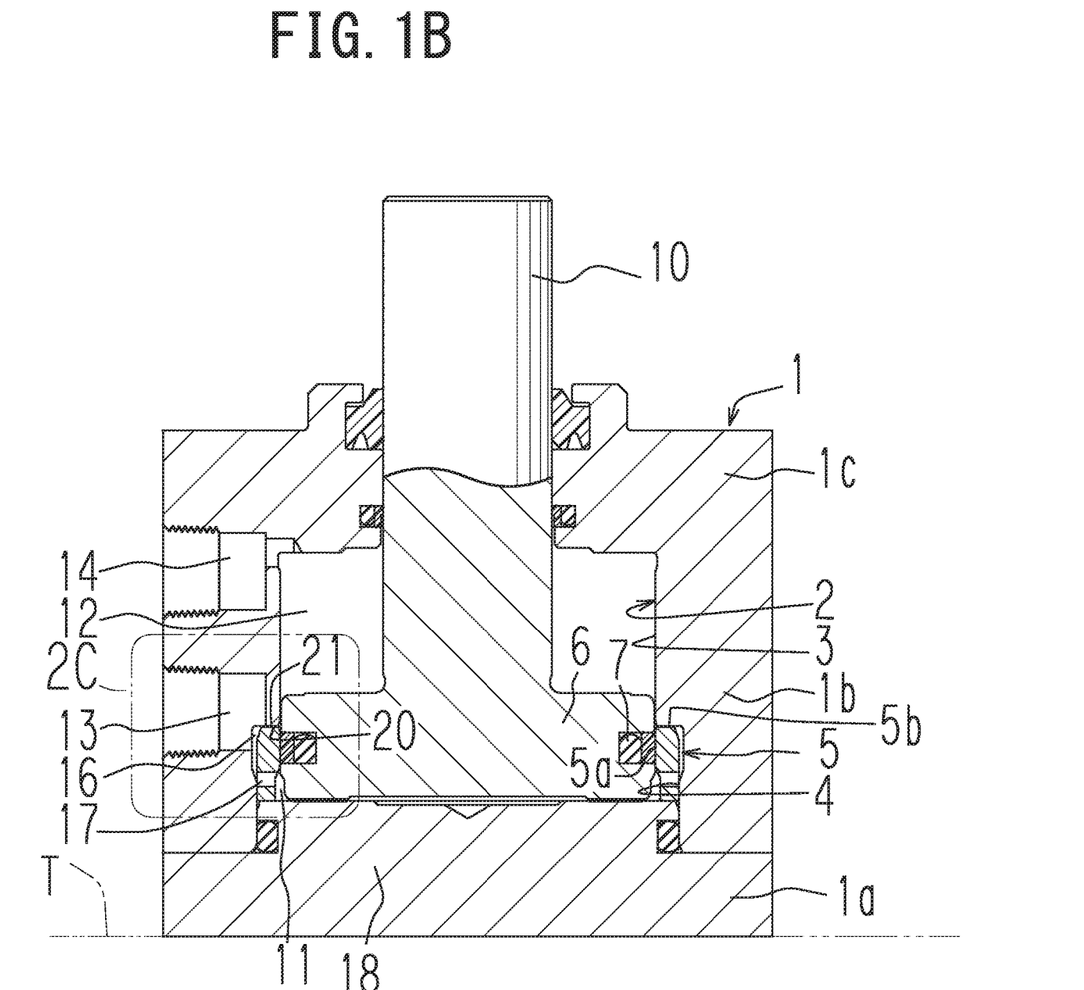
FIG. 1B is a partial elevational view in section of the cylinder device in a release state, and is a diagram similar to FIG. 1A.

To cause the cylinder device to transition from the lock state of FIG. 1A to a release state of FIG. 1B for releasing, pressurized oil is discharged from the lock chamber 11 to the tank through the lock-side supply and discharge passage 13, and pressurized oil is supplied by the pressurized oil supply source from the tank to the release chamber 12 through the release-side supply and discharge passage 14. Then, as shown in FIG. 2B, the pressurized oil in the release chamber 12 moves the piston 6 downward toward a lower limit position. As a result, the sealing member 7 of the piston 6 passes by the communication passage 21. Subsequently, as shown in FIG. 2C, an upper end portion of the outer sealing member 7b of the sealing member 7 is moved below the communication passage 21. At this time, communication between the release chamber 12 and the lock-side supply and discharge passage 13 through the communication passage 21 is opened. Then, pressurized oil is supplied by the pressurized oil supply source from the tank (both are not illustrated) to the release-side supply and discharge passage 14 and to the release chamber 12, and some of the pressurized oil in the release chamber 12 is returned to the tank through the communication passage 21 and through the lock-side supply and discharge passage 13. Thereafter, the piston 6 is received by the lower wall 1a of the housing 1 from below. This arrangement makes it possible to replace the pressurized oil in the release chamber 12, and to keep the temperature of the pressurized oil in the release chamber 12 not to exceed a predetermined temperature, or to cool the pressurized oil in the release chamber 12. Furthermore, air and/or foreign matter having entered into the release chamber 12 is/are discharged to an outside of the cylinder device, which makes it possible to keep the inside of the release chamber 12 clean.

To cause the cylinder device to transition from the release state of FIG. 1B to the lock state of FIG. 1A for locking, the pressurized oil in the release chamber 12 is discharged through the release-side supply and discharge passage 14 to the tank, and pressurized oil is supplied by the pressurized oil supply source from the tank to the lock-side supply and discharge passage 13. Then, the pressurized oil in the lock-side supply and discharge passage 13 flows into the release chamber 12 through the communication passage 21 and flows into the lock chamber 11 through the through holes 17. Now, because the opening area $S_2$ of the through holes 17 of the annular sleeve 5 is larger than the opening area $S_1$ of the communication passage 21, the flow rate of pressurized oil supplied to the lock chamber 11 is larger than the flow rate of pressurized oil supplied to the release chamber 12. This makes the pressure in the lock chamber 11 higher than the pressure in the release chamber 12. Consequently, the pressure differential between the pressure in the release chamber 12 and the pressure in the lock chamber 11 acts upward to the piston 6, to move and return the piston 6 upward. Subsequently, as shown in FIG. 2B and FIG. 2A, a lower end portion of the outer sealing member 7b of the sealing member 7 is moved above the communication passage 21. At this time, the communicative state, in which communication between the release chamber 12 and the communication passage 21 is opened, ends (transition to the non-communicative state: communication between the release chamber 12 and the communication passage 21 is closed). Thereafter, the piston 6 is received by the upper wall 1c.

The above-described embodiment provides the following advantages.

In the cylinder device of this embodiment, a valve member and a valve-closing spring do not have to be provided in the piston 6, differently from the above-described known cylinder device. This makes it possible to downsize the piston 6 in its axial direction (thickness direction). This allows the cylinder device to be compact in size with a mechanically simple structure.

Furthermore, in the release state of the cylinder device, pressurized oil is supplied by the pressurized oil supply source from the tank to the release chamber 12 through the release-side supply and discharge passage 14, and pressurized oil in the release chamber 12 is discharged to the tank through the communication passage 21 and through the lock-side supply and discharge passage 13. Due to this, the pressurized oil in the release chamber 12 is replaced. As a result, even when the temperature of peripheral devices and/or the atmosphere is/are kept high, the replacement of pressurized oil allows the temperature of the cylinder device to be lower than the temperature of the peripheral devices and/or the like. This prevents damage, deformation, and/or deterioration of components of the cylinder device such as the sealing member 7 by heat. Furthermore, through the above-described replacement of pressurized oil, gas such as air and/or foreign matter having entered into the pressure fluid in the release chamber 12 is/are discharged to the outside through the communication passage 21. This enables stable operation of the cylinder device.

Moreover, the opening area $S_2$ of the through holes 17 is designed to be larger than the opening area $S_1$ of the communication passage 21. This allows the flow rate of pressure fluid flowing from the lock-side supply and discharge passage 13 to the lock chamber 11 to be larger than the flow rate of pressure fluid flowing from the lock-side supply and discharge passage 13 to the release chamber 12 through the communication passage 21 at a time of starting the transition of the cylinder device from the release state to the lock state for locking. Due to this, the pressure differential between the pressure in the lock chamber 11 and the pressure in the release chamber 12 reliably causes the piston 6 to move upward for locking.

The above-described embodiment is changeable as follows.

Instead of the pressurized oil described by way of example, pressure fluid may be liquid other than the pressurized oil.

The communication passage 21 may be provided at a lower portion of the step portion 20 as shown in FIG. 3B, instead of or in addition to that at the upper end portion of the annular sleeve 5 as shown in FIG. 3A. Furthermore, the communication passage 21 may be structured by one or more small-diameter holes, instead of the shallow grooves described by way of example.

Instead of the arrangement in which the release chamber 12 is provided above the piston 6 while the lock chamber 11 is provided below the piston 6, the following arrangement is also possible: the release chamber 12 is provided below the piston 6 while the lock chamber 11 is provided above the piston 6.

The communication passage 21 and the through holes 17 may be directly provided to the housing 1, without using the component of the annular sleeve 5.

Moreover, it is a matter of course that other changes or alterations can be made on the present invention within the scope of envisagement of one skilled in the art.

REFERENCE SIGNS LIST

1: housing; 2: cylinder hole; 3: small-diameter hole; 4: large-diameter hole; 5: annular sleeve; 5a: inner peripheral hole; 5b: upper end surface (second-side end surface) 6: piston; 7: sealing member; 11: lock chamber; 12: release chamber; 13: lock side supply and discharge passage; 14: release side supply and discharge passage; 17: through hole; 20: step portion; 21: communication passage.

The invention claimed is:

1. A cylinder device comprising:
a piston hermetically inserted via a sealing member in a cylinder hole provided in a housing so that the piston is movable in an axial direction;
a lock chamber provided on a first-end side of the piston in the axial direction;
a release chamber provided on a second-end side of the piston in the axial direction;
a lock-side supply and discharge passage through which pressure fluid is supplied to and discharged from the lock chamber;
a release-side supply and discharge passage through which pressure fluid is supplied to and discharged from the release chamber; and
a communication passage provided in an inner peripheral wall of the cylinder hole, wherein:
the cylinder hole is structured by a small-diameter hole provided in the housing, and an inner peripheral hole of an annular sleeve attached to a large-diameter hole provided on the first end side of the small-diameter hole;
the communication passage is provided between a step portion, which is provided between the small-diameter hole and the large-diameter hole, and a second-end-side end surface of the annular sleeve so that the communication passage extends in a circumferential direction;
an opening area of the communication passage is designed to be smaller than an opening area of a cylinder-hole-side opening of the lock-side supply and discharge passage which is close to the cylinder hole;
when the piston is moved from the second end side to a limit position on the first end side, the sealing member is moved from a position closer to the second end side than the communication passage toward the first end side beyond the communication passage, thereby to open communication between the release-side supply and discharge passage and the lock-side supply and discharge passage through the release chamber and through the communication passage; and
when the piston is moved from the limit position on the first end side toward the second end side, the sealing member is moved from a position closer to the first end side than the communication passage toward the second side beyond the communication passage, thereby to close communication between the release chamber and the communication passage.

2. The cylinder device according to claim 1, wherein:
at least one through hole structuring a part of the lock-side supply and discharge passage is provided at the annular sleeve; and
an opening of the through hole functions as the cylinder-hole-side opening of the lock-side supply and discharge passage.

* * * * *